US010723393B2

(12) United States Patent
Izuhara et al.

(10) Patent No.: US 10,723,393 B2
(45) Date of Patent: Jul. 28, 2020

(54) VEHICLE LOWER PORTION STRUCTURE

(71) Applicant: TOYOTA JIDOSHA KABUSHIKI KAISHA, Toyota-shi, Aichi-ken (JP)

(72) Inventors: Tsuyoshi Izuhara, Toyota (JP); Shintaro Kitakata, Nisshin (JP); Kentaro Nakamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 16/108,664

(22) Filed: Aug. 22, 2018

(65) Prior Publication Data

US 2019/0071134 A1 Mar. 7, 2019

(30) Foreign Application Priority Data

Sep. 1, 2017 (JP) .................. 2017-168575

(51) Int. Cl.
| | |
|---|---|
| *B62D 29/04* | (2006.01) |
| *B62D 25/20* | (2006.01) |
| *B62D 29/00* | (2006.01) |
| *B62D 27/02* | (2006.01) |
| *B62D 21/15* | (2006.01) |
| *B62D 43/04* | (2006.01) |

(52) U.S. Cl.
CPC ........... *B62D 29/041* (2013.01); *B62D 25/20* (2013.01); *B62D 27/02* (2013.01); *B62D 29/005* (2013.01); *B62D 29/043* (2013.01); *B62D 21/152* (2013.01); *B62D 25/2027* (2013.01); *B62D 27/026* (2013.01); *B62D 43/04* (2013.01)

(58) Field of Classification Search
CPC ...... B62D 29/041; B62D 25/20; B62D 27/02; B62D 29/005; B62D 29/043; B62D 21/152; B62D 25/2027; B62D 27/026; B62D 43/04
See application file for complete search history.

(56) References Cited

U.S. PATENT DOCUMENTS

| | | | |
|---|---|---|---|
| 4,416,461 A | 11/1983 | Hayashi et al. | |
| 4,581,192 A | 4/1986 | Malen | |
| 5,918,549 A | * 7/1999 | Basile | .................... B61D 17/10 |
| | | | 105/422 |
| 9,132,713 B1 | * 9/2015 | Akaki | .................. B60G 21/051 |
| 2008/0061600 A1 | 3/2008 | Ebina et al. | |

(Continued)

FOREIGN PATENT DOCUMENTS

| | | |
|---|---|---|
| EP | 1900614 A1 | 3/2008 |
| JP | S51-017911 U | 2/1976 |

(Continued)

OTHER PUBLICATIONS

Feb. 18, 2019 Extended Search Report issued in European Patent Application No. 18191452.4.

*Primary Examiner* — Lori L Lyjak
(74) *Attorney, Agent, or Firm* — Oliff PLC

(57) ABSTRACT

A vehicle lower portion structure includes a resinous floor panel constituting a vehicle cabin floor surface, and a metallic reinforcing member. The reinforcing member is disposed to be bridged between vehicle skeleton members on a lower side of the floor panel and is configured to support a vehicle-mounted object disposed on the lower side of the floor panel.

8 Claims, 10 Drawing Sheets

(56) References Cited

U.S. PATENT DOCUMENTS

| | | | | |
|---|---|---|---|---|
| 2011/0175401 A1* | 7/2011 | Fujimura | ........... | B62D 25/2027 |
| | | | | 296/203.04 |
| 2016/0368547 A1 | 12/2016 | Franceschini et al. | | |
| 2017/0297632 A1* | 10/2017 | Ayuzawa | ................ | B62D 21/11 |
| 2017/0297633 A1* | 10/2017 | Ayuzawa | ........... | B62D 25/2045 |
| 2017/0361875 A1* | 12/2017 | Ayuzawa | ............... | B62D 21/15 |

FOREIGN PATENT DOCUMENTS

| | | |
|---|---|---|
| JP | S55-124377 U | 9/1980 |
| JP | S61-078079 U | 5/1986 |
| JP | H04-095585 A | 3/1992 |
| JP | 2004-322920 A | 11/2004 |
| JP | 2007-038717 A | 2/2007 |
| JP | 2007-091161 A | 4/2007 |
| KR | 10-2001-0066234 A | 7/2001 |
| KR | 10-2008-0024073 A | 3/2008 |

\* cited by examiner

VEHICLE LOWER PORTION STRUCTURE

INCORPORATION BY REFERENCE

The disclosure of Japanese Patent Application No. 2017-168575 filed on Sep. 1, 2017 including the specification, drawings and abstract is incorporated herein by reference in its entirety.

BACKGROUND

1. Technical Field

The disclosure relates to a vehicle lower portion structure.

2. Description of Related Art

US 2016/0368547 A discloses a vehicle lower portion structure to which a resinous rear floor panel is applied. Specifically, the rear end portion of the rear floor panel is attached to a lower back panel in the structure in which a spare tire is supported on the resinous rear floor panel. A metallic holding member is attached to the upper surface of the rear floor panel, and one end portion of the holding member is fastened to a lower back and the other end portion of the holding member is attached to the spare tire. Dropping of the spare tire from the rear floor panel during a collision is suppressed by the lower back and the spare tire being connected by the holding member. Structures to which a resinous floor panel is similarly applied include the structures that are disclosed in Japanese Unexamined Patent Application Publication No. 2007-091161 (JP 2007-091161 A), Japanese Unexamined Patent Application Publication No. 2004-322920 (JP 2004-322920 A), and Japanese Unexamined Patent Application Publication No. 4-095585 (JP 4-095585 A).

SUMMARY

By a floor panel being formed of resin as in US 2016/0368547 A, JP 2007-091161 A, JP 2004-322920 A, and JP 4-095585 A, more weight reduction can be achieved than in a structure to which a metallic floor panel is applied. However, in the structure that is disclosed in US 2016/0368547 A, a load from a vehicle-mounted object such as a spare tire concentrates on the part where the floor panel and the holding member are fastened to each other, and thus damage to the floor panel may arise.

The disclosure provides a vehicle lower portion structure with which damage to a floor panel attributable to a load from a vehicle-mounted object can be suppressed in a vehicle provided with the resinous floor panel.

An aspect of the disclosure relates to a vehicle lower portion structure including a resinous floor panel and a metallic reinforcing member. The resinous floor panel constitutes a vehicle cabin floor surface. The metallic reinforcing member is disposed to be bridged between vehicle skeleton members on a lower side of the floor panel and is configured to support a vehicle-mounted object disposed on the lower side of the floor panel.

In the vehicle lower portion structure according to the aspect of the disclosure, the resinous floor panel constitutes a vehicle cabin floor. The metallic reinforcing member is disposed to be bridged between the vehicle skeleton members on the lower side of the floor panel, and the reinforcing member supports the vehicle-mounted object. Accordingly, a load from the vehicle-mounted object is transmitted to the vehicle skeleton member via the reinforcing member. As a result, direct load transmission from the vehicle-mounted object to the floor panel can be suppressed. Here, the vehicle skeleton member refers to a member constituting the skeleton of a vehicle by being provided with a closed sectional region at least in part.

In the vehicle lower portion structure according to the aspect of the disclosure, the reinforcing member may be bridged between a pair of vehicle skeleton members extending in a vehicle front-rear direction at both sides of the floor panel in a vehicle width direction.

In the vehicle lower portion structure according to the aspect of the disclosure, a load from the vehicle-mounted object can be transmitted via the reinforcing member to the vehicle skeleton member extending in the vehicle front-rear direction at the both sides of the floor panel in the vehicle width direction.

In the vehicle lower portion structure according to the aspect of the disclosure, a cross member may be bridged between the vehicle skeleton members on a front side or a rear side of the reinforcing member and a support member connected to the cross member and the reinforcing member and supporting the vehicle-mounted object may be disposed on the lower side of the floor panel.

In the vehicle lower portion structure according to the aspect of the disclosure, the cross member is disposed on the front side or the rear side of the reinforcing member and the cross member is bridged between the vehicle skeleton members. The support member is connected to the cross member and the reinforcing member on the lower side of the floor panel, and the support member supports the vehicle-mounted object. As a result, a load from the vehicle-mounted object can be dispersed to the cross member and the reinforcing member.

In the vehicle lower portion structure according to the aspect of the disclosure, a plurality of the reinforcing members may be provided such that the reinforcing members are spaced apart from each other in the vehicle front-rear direction and a support member connected to the reinforcing members and supporting the vehicle-mounted object may be disposed on the lower side of the floor panel.

In the vehicle lower portion structure according to the aspect of the disclosure, the reinforcing members are provided to be spaced apart from each other in the vehicle front-rear direction and the support member is connected to the reinforcing members on the lower side of the floor panel. The support member supports the vehicle-mounted object, and thus a load from the vehicle-mounted object can be dispersed to the reinforcing members.

In the vehicle lower portion structure according to the aspect of the disclosure, the reinforcing member may be an elongated member with a longitudinal direction corresponding to a bridged direction of the reinforcing member and at least a part of the reinforcing member may be formed in a hat shape that opens upwards in section when seen from the longitudinal direction.

In the vehicle lower portion structure according to the aspect of the disclosure, the rigidity of the reinforcing member can be improved by at least a part of the reinforcing member being formed in a hat shape in section. The reinforcing member has a hat shape that opens upwards in section, and thus is shaped to protrude downwards. As a result, the gap between the vehicle-mounted object and the floor panel can be enlarged compared to an upside-down reinforcing portion once the vehicle-mounted object is supported with the protruding part.

In the vehicle lower portion structure according to the aspect of the disclosure, a stiffening rib may be formed in the vicinity of a joining part of the reinforcing member with respect to the vehicle skeleton member.

In the vehicle lower portion structure according to the aspect of the disclosure, the stiffening rib is formed in the vicinity of the joining part of the reinforcing member with respect to the vehicle skeleton member, and thus the strength and the rigidity of the joining part can be improved.

In the vehicle lower portion structure according to the aspect of the disclosure, a reinforcing flange may extend upwards or downwards from an outer edge of the reinforcing member in at least both end portions of the reinforcing member in the bridged direction.

In the vehicle lower portion structure according to the aspect of the disclosure, the reinforcing flange is capable of improving the strength and the rigidity of both end portions of the reinforcing member in the bridged direction.

In the vehicle lower portion structure according to the aspect of the disclosure, the floor panel may be a rear floor panel disposed in a vehicle rear portion.

In the vehicle lower portion structure according to the aspect of the disclosure, the rear floor panel of the vehicle rear portion is formed of resin, and thus the weight of the vehicle rear portion can be reduced compared to a structure to which a metallic rear floor panel is applied.

As described above, with the vehicle lower portion structure according to the aspect of the disclosure, an excellent effect is obtained in that damage to the floor panel attributable to a load from a vehicle-mounted object can be suppressed in a vehicle provided with the resinous floor panel.

Furthermore, with the vehicle lower portion structure according to the aspect of the disclosure, an excellent effect is obtained in that the vehicle skeleton members on both sides in the vehicle width direction are capable of supporting a load from a vehicle-mounted object.

Furthermore, with the vehicle lower portion structure according to the aspect of the disclosure, an excellent effect is obtained in that concentration of a load from a vehicle-mounted object on the reinforcing member can be suppressed.

Furthermore, with the vehicle lower portion structure according to the aspect of the disclosure, an excellent effect is obtained in that the rigidity of the reinforcing member can be improved and interference between a vehicle-mounted object and the floor panel can be suppressed at the same time.

Furthermore, with the vehicle lower portion structure according to the aspect of the disclosure, an excellent effect is obtained in that the strength and the rigidity of the joining part between the vehicle skeleton member and the reinforcing member on which a load from a vehicle-mounted object is likely to concentrate can be improved.

Furthermore, with the vehicle lower portion structure according to the aspect of the disclosure, an excellent effect is obtained in that the strength and the rigidity of both end portions in the bridged direction of the reinforcing member can be improved, Furthermore, with the vehicle lower portion structure according to the aspect of the disclosure, an excellent effect is obtained in that the weight of the vehicle rear portion can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
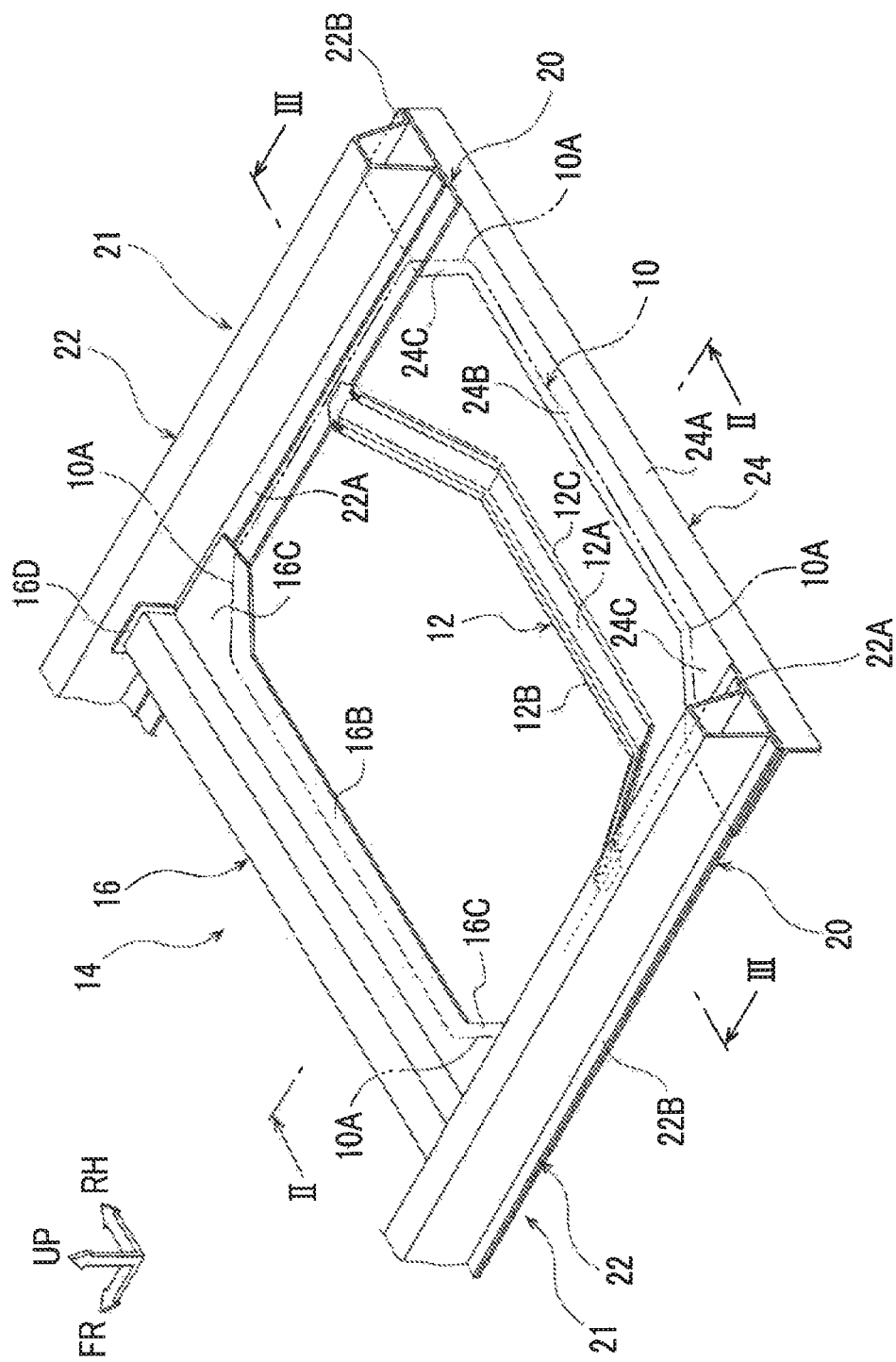
FIG. 1 is a perspective view illustrating a vehicle rear floor to which a vehicle lower portion structure according to a first embodiment is applied.

Hereinafter, a vehicle lower portion structure according to a first embodiment will be described with reference to accompanying drawings. The arrows FR, UP, and RH appropriately shown in the drawings represent the forward direction of a vehicle, the upward direction of the vehicle, and the right side of the vehicle that is headed in the traveling direction thereof, respectively. Unless otherwise noted, the front and rear, the upper and lower sides, and the right and left in the following description refer to the front and rear in the front-rear direction of the vehicle, the upper and lower sides in the up-down direction of the vehicle, and the right and left in the width direction of the vehicle that is headed in the traveling direction thereof, respectively.

Overall Configuration of Vehicle Lower Portion

An overall configuration of a vehicle lower portion will be described first, and then a reinforcement as a reinforcing member that is a main part will be described in detail. As illustrated in FIG. 1, the vehicle lower portion structure according to the first embodiment is applied to a vehicle rear portion and provided with a resinous rear floor panel 10 as a floor panel. For convenience of description, the rear floor panel 10 is drawn in the form of an imaginary line and a reinforcement 12 (described later) as a reinforcing member is visible in FIG. 1. The same applies to FIGS. 7 and 9.

Figure 2:
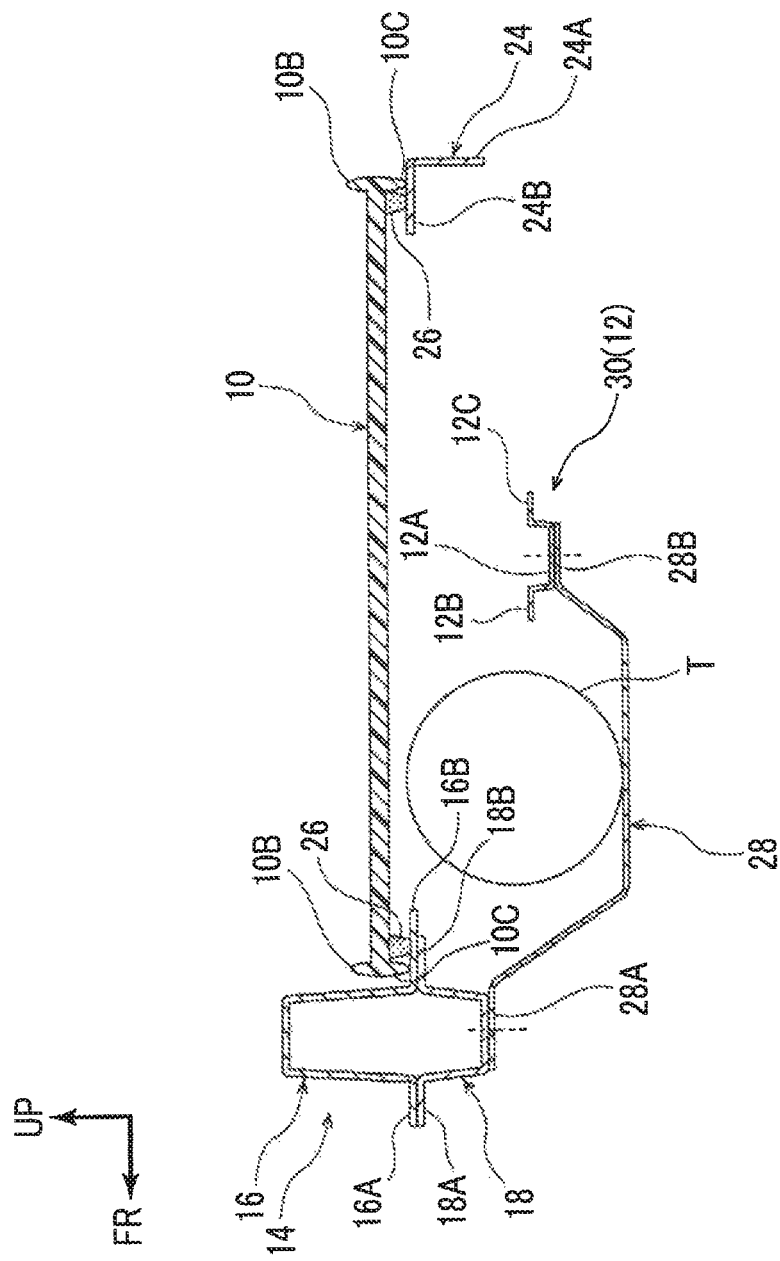
FIG. 2 is a sectional view taken along line II-II of FIG. 1.
Figure 3:
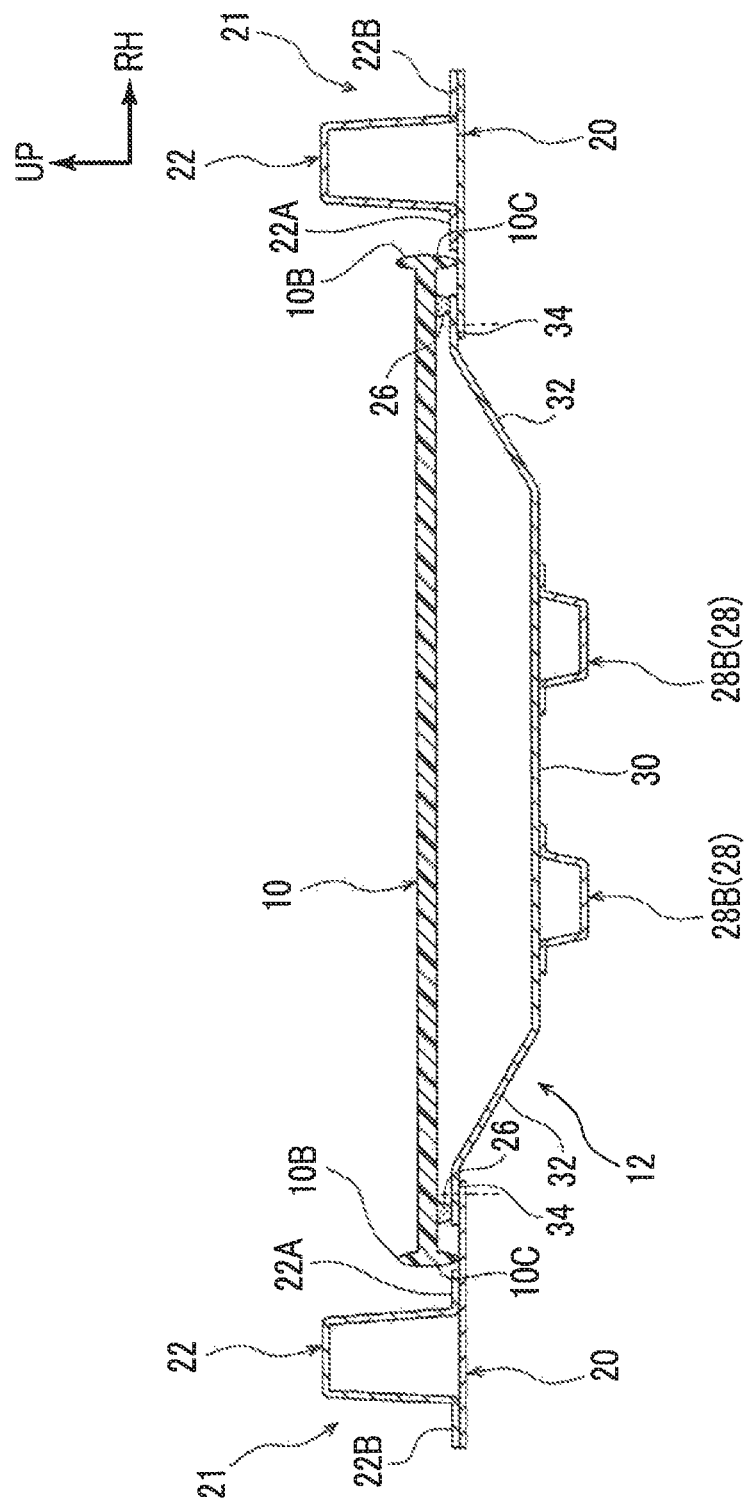
FIG. 3 is a sectional view taken along line III-III of FIG. 1.

The rear floor panel 10 is formed in a flat plate shape and of fiber reinforced plastic such as glass fiber reinforced plastic (GFRP) and carbon fiber reinforced plastic (CFRP). The rear floor panel 10 constitutes a vehicle cabin floor surface in the vehicle rear portion. In plan view, the rear floor panel 10 is formed in a substantially rectangular shape in which four corner portions 10A are cut. In addition, as illustrated in FIGS. 2 and 3, an upper rib 10B extends upwards from the outer peripheral edge portion of the rear floor panel 10 and a lower rib 10C extends downwards from the outer peripheral edge portion of the rear floor panel 10. The rigidity of the rear floor panel 10 is enhanced by the upper rib 10B and the lower rib 10C.

As illustrated in FIG. 1, the front end portion of the rear floor panel 10 is joined to a rear cross member 14 as a vehicle skeleton member. Both end portions of the rear floor panel 10 in the vehicle width direction are joined to a rear floor side 20. Furthermore, the rear end portion of the rear floor panel 10 is joined to an attachment bracket 24, The rear cross member 14, the rear floor side 20, and the attachment bracket 24 will be described in detail later.

A pair of rear members 22 is provided such that the rear members 22 are respectively disposed on both sides of the rear floor panel 10 in the vehicle width direction. Each of the rear members 22 is formed by press molding being performed on a metal plate and extends in the vehicle front-rear direction. The rear member 22 is formed in a substantially hat shape that opens downwards in section when seen from the vehicle front-rear direction. An inside flange 22A extends on the inside of the rear member 22 in the vehicle width direction, and an outside flange 22B extends on the outside of the rear member 22 in the vehicle width direction.

The rear floor side 20 is disposed on the lower side of the rear member 22. The rear floor side 20 is formed in a flat plate shape and of a metal plate and extends in the vehicle front-rear direction. Here, the inside flange 22A of the rear member 22 overlaps and is joined by spot welding or the like to the upper surface of the rear floor side 20 that is on the inside in the vehicle width direction. Likewise, the outside flange 22B of the rear member 22 overlaps and is joined by spot welding or the like to the upper surface of the rear floor side 20 that is on the outside in the vehicle width direction.

As illustrated in FIG. 3, a vehicle skeleton member 21 with a closed sectional structure is configured by the rear member 22 and the rear floor side 20 being joined to each other. The end portion of the rear floor side 20 that is on the inside in the vehicle width direction extends to the inside in the vehicle width direction beyond the inside flange 22A of the rear member 22, and the rear floor panel 10 overlaps and is joined by an adhesive 26 to the upper surface of the end portion of the rear floor side 20 that is on the inside in the vehicle width direction. At this time, infiltration of the adhesive 26 into the vehicle cabin is suppressed by the lower rib 10C extending downwards from the outer peripheral edge portion of the rear floor panel 10.

As illustrated in FIG. 1, the rear cross member 14 is disposed on the front side ahead of the rear floor panel 10. The rear cross member 14 is bridged between the rear members 22 in the vehicle width direction as the longitudinal direction thereof. As illustrated in FIG. 2, the rear cross member 14 has a closed sectional structure by including a lower panel 18 and an upper panel 16 constituting the vehicle upper side.

The upper panel 16 is formed by press molding being performed on a metal plate and formed in a substantially hat shape that opens downwards in section when seen from the vehicle width direction. The lower panel 18 is formed by press molding being performed on a metal plate and formed in a substantially hat shape that opens upwards in section when seen from the vehicle width direction. An upper side front flange 16A in the front end portion of the upper panel 16 and a lower side front flange 18A in the front end portion of the lower panel 18 overlap and are joined by spot welding or the like to each other. Likewise, an upper side rear flange 16B in the rear end portion of the upper panel 16 and a lower side rear flange 18B in the rear end portion of the lower panel 18 overlap and are joined by spot welding or the like to each other.

The rear floor panel 10 overlaps and is joined by the adhesive 26 to the upper surface of the upper side rear flange 16B of the upper panel 16. As illustrated in FIG. 1, the upper side rear flange 16B in both end portions of the upper panel 16 in the vehicle width direction is an expanded portion 16C expanded rearwards from the upper side rear flange 16B that is in the middle portion in the vehicle width direction. The corner portion 10A of the rear floor panel 10 overlaps and is joined by the adhesive 26 (refer to FIG. 2) to the expanded portion 16C. Right and left flanges 16D extend along the rear member 22 from both end portions of the upper panel 16 in the vehicle width direction. The right and left flanges 16D are joined by spot welding or the like to the rear member 22.

The attachment bracket 24 is disposed on the rear side behind the rear floor panel 10. The attachment bracket 24 is formed by a metal plate being bent and extends from the outside flange 22B of the rear member 22 on the vehicle right side to the outside flange 22B of the rear member 22 on the vehicle left side in the vehicle width direction as the longitudinal direction thereof. The attachment bracket 24 is formed in a substantially L-shape in section when seen from the vehicle width direction by including a vertical wall portion 24A extending in the vehicle up-down direction and a lateral wall portion 24B extending forwards from the upper end of the vertical wall portion 24A. The vertical wall portion 24A of the attachment bracket 24 is joined to a lower back panel (not illustrated). When it comes to the lateral wall portion 24B, both end portions of the lateral wall portion 24B in the vehicle width direction overlap and are joined by spot welding or the like to the lower surface of the rear floor side 20. The three pieces of the rear member 22, the rear floor side 20, and the lateral wall portion 24B may be joined by spot welding or the like or the rear floor side 20 and the lateral wall portion 24B may be welded in a place other than the portion where the rear member 22 and the rear floor side 20 are welded.

As illustrated in FIG. 2, the rear floor panel 10 overlaps and is joined by the adhesive 26 to the upper surface of the lateral wall portion 24B of the attachment bracket 24. As illustrated in FIG. 1, the lateral wall portion 24B in both end portions of the attachment bracket 24 in the vehicle width direction is an expanded portion 24C expanded forwards from the lateral wall portion 24B that is in the middle portion in the vehicle width direction. The corner portion 10A of the rear floor panel 10 overlaps and is joined by the adhesive 26 (refer to FIG. 2) to the expanded portion 24C.

As described above, the expanded portion 16C of the rear cross member 14 and the expanded portion 24C of the attachment bracket 24 are expanded to correspond to the corner portion 10A of the rear floor panel 10 and the corner portion 10A of the rear floor panel 10 is joined by the adhesive 26 to the expanded portion 16C and the expanded portion 24C.

The reinforcement 12 is disposed on the lower side of the rear floor panel 10. The reinforcement 12 is bridged between a pair of the vehicle skeleton members 21 that the rear member 22 and the rear floor side 20 constitute. The reinforcement 12 is an elongated member bridged in the vehicle width direction as the longitudinal direction thereof. The reinforcement 12 will be described in detail later.

As illustrated in FIGS. 2 and 3, a support member 28 is disposed on the lower side of the rear floor panel 10. The support member 28 according to the first embodiment is an elongated metal member, and the vehicle front-rear direction is the longitudinal direction thereof. In the first embodiment, two support members 28 are provided to be spaced apart from each other in the vehicle width direction. The two support members 28 support a hydrogen tank T as an example of a vehicle-mounted object. The vehicle-mounted object may also be a canister, a battery, or a spare tire instead of the hydrogen tank T.

The support member 28 is formed in a substantially hat shape when seen from the vehicle width direction. A front flange portion 28A extends forwards from the front end portion of the support member 28. The front flange portion 28A is joined by spot welding or the like to the lower panel 18 of the rear cross member 14. A rear flange portion 28B extends rearwards from the rear end portion of the support member 28. The rear flange portion 28B is joined by spot welding or the like to a projecting portion 12A (described later) of the reinforcement 12. In other words, the support member 28 is connected to the rear cross member 14 and the reinforcement 12 and supported by the rear cross member 14 and the reinforcement 12.

The hydrogen tank T is a substantially tubular member disposed such that the vehicle width direction is the longitudinal direction thereof. The support member 28 holds the hydrogen tank T. The hydrogen tank T is configured such that a valve (not illustrated) is disposed in one axial end portion of the hydrogen tank T and piping connection to the valve allows the hydrogen tank T to be filled with hydrogen and hydrogen to be supplied from the hydrogen tank T to a supply destination such as a fuel cell (FC) stack.

Configuration of Reinforcement

As illustrated in FIG. 3, the middle portion of the reinforcement 12 in the vehicle width direction is a support portion 30 extending substantially in parallel to the rear floor panel 10 and the support member 28 is fastened to the support portion 30. An inclined portion 32 is inclined upwards from both end portions of the support portion 30 in the vehicle width direction toward the outside in the vehicle width direction. The end portion of the inclined portion 32 that is on the outside in the vehicle width direction is a joining portion 34 extending substantially horizontally to the outside in the vehicle width direction. The joining portion 34 overlaps and is joined by spot welding or the like to the upper surface of the rear floor side 20.

The upper surface of the joining portion 34 overlaps and is joined by the adhesive 26 to the lower surface of the rear floor panel 10. The adhesive that is used in the first embodiment is an elastic adhesive such as mastic. Accordingly, even in a case where there is a step between the upper surface of the rear floor side 20 and the upper surface of the joining portion 34 of the reinforcement 12, the step is absorbed by the adhesive.

Figure 4:
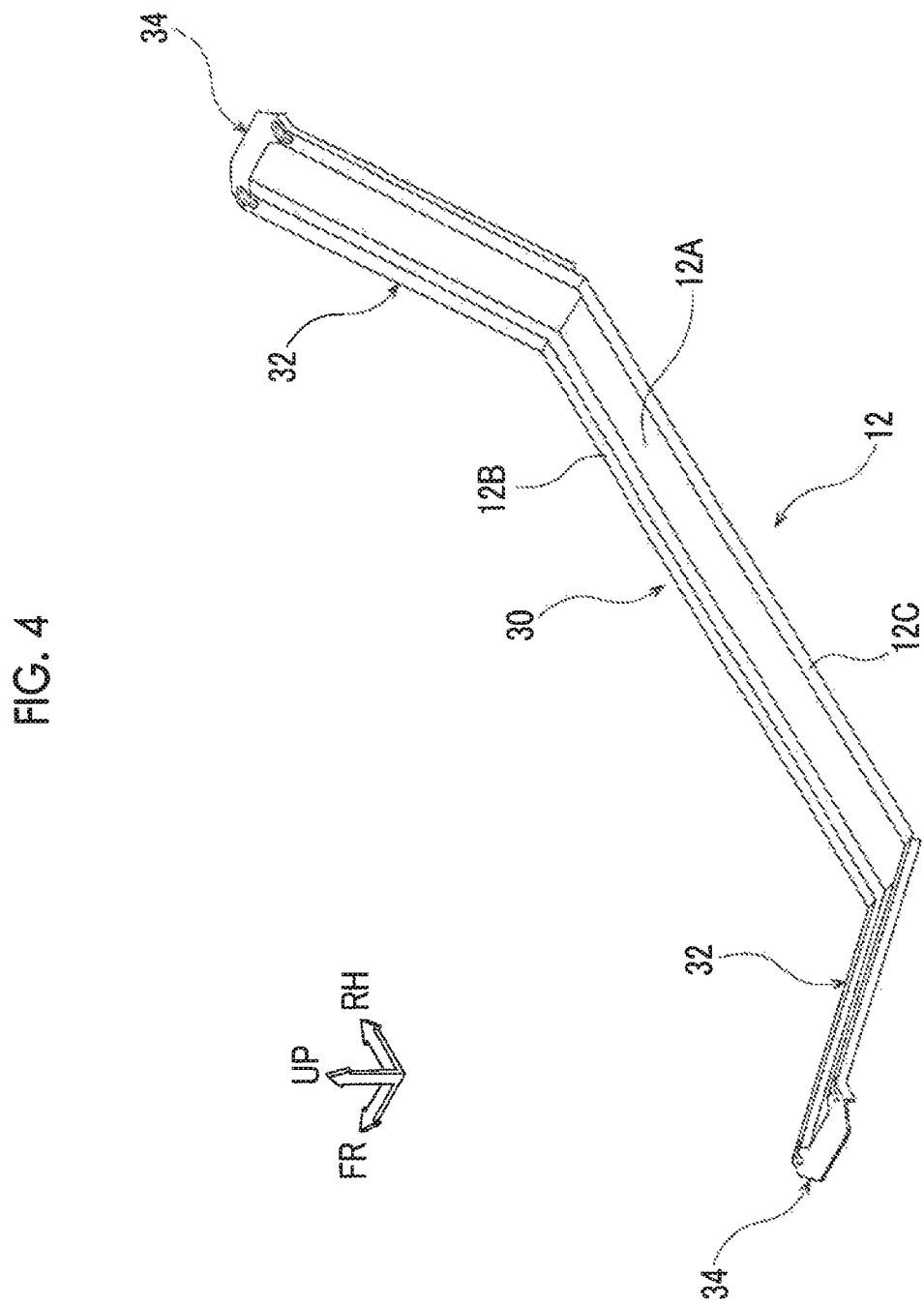
FIG. 4 is a perspective view illustrating a reinforcement according to the first embodiment.

As illustrated in FIG. 4, the reinforcement 12 is formed to have substantially the same width from one end portion to the other end portion in the longitudinal direction thereof and formed in a substantially hat shape that opens upwards in section when seen from the longitudinal direction with the exception of the joining portion 34. In other words, the reinforcement 12 is configured to include the projecting portion 12A that has a substantially U-shape in section, a front flange portion 12B that extends forwards from the projecting portion 12A, and a rear flange portion 12C that extends rearwards from the projecting portion 12A.

Each of the front flange portion 12B and the rear flange portion 12C is continuously formed to have substantially the same width from the inclined portion 32 on one side to the inclined portion 32 on the other side. The joining portion 34 is formed by front-rear connection between both end portions of the front flange portion 12B in the vehicle width direction and both end portions of the rear flange portion 12C in the vehicle width direction.

Figure 5:
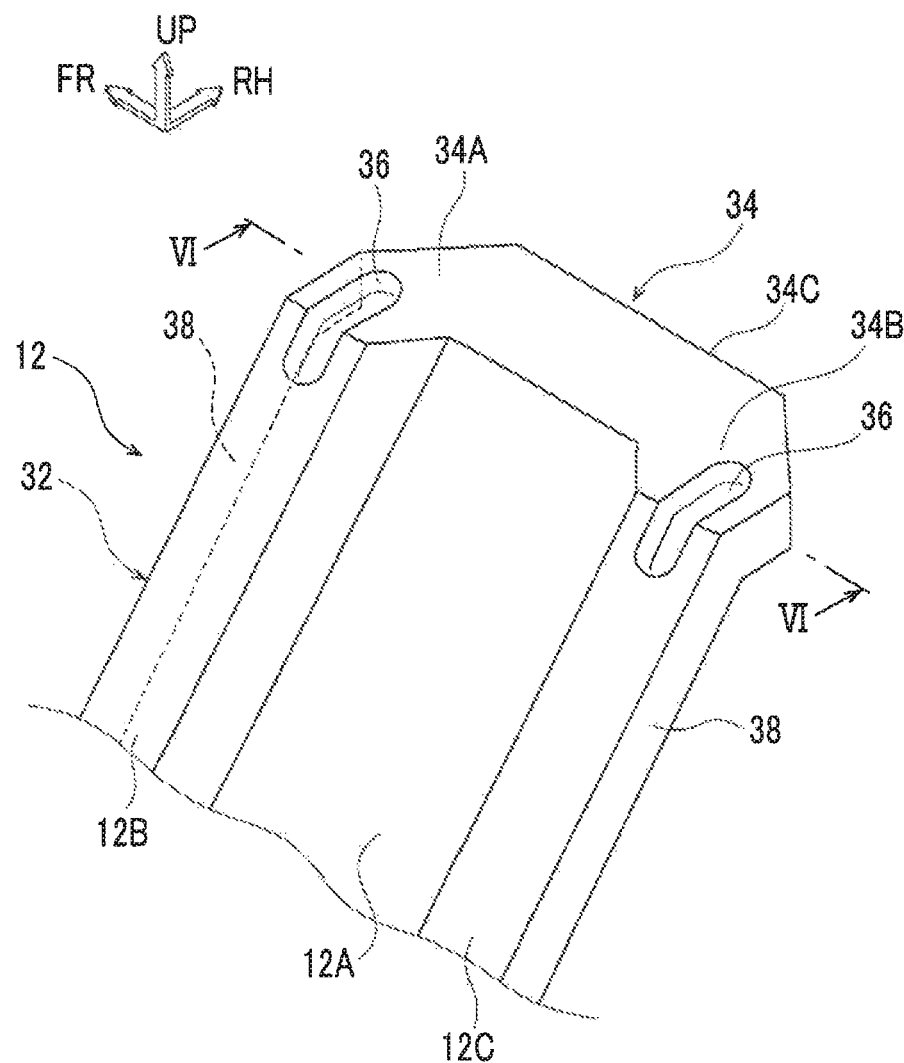
FIG. 5 is an enlarged perspective view in which an end portion of the reinforcement according to the first embodiment is illustrated in an enlarged manner.

As illustrated in FIG. 5, in plan view, the joining portion 34 of the reinforcement 12 is formed in a substantially flat U-shape and open on the inside in the vehicle width direction. In other words, the joining portion 34 is configured to include a front side joining portion 34A extending in the vehicle width direction on the front side, a rear side joining portion 34B extending in the vehicle width direction on the rear side, and a middle side joining portion 34C connecting the end portion of the front side joining portion 34A that is on the outside in the vehicle width direction and the end portion of the rear side joining portion 34B that is on the outside in the vehicle width direction in the front-rear direction.

The upper surface of the front side joining portion 34A, the upper surface of the rear side joining portion 34B, and the upper surface of the middle side joining portion 34C constitute the same continuous plane. Furthermore, the middle side joining portion 34C has cut corner portions on the front and rear end sides thereof. In plan view, the middle side joining portion 34C is formed in a substantially trapezoidal shape in which the outside in the vehicle width direction is the short side.

Figure 6:
FIG. 6 is an enlarged sectional view taken along line VI-VI of FIG. 5.

In the joining portion 34, a stiffening rib (recessed portion or projecting portion to be reinforced) 36 is formed in the vicinity of each of the front side joining portion 34A and the rear side joining portion 34B, The stiffening rib 36 extends in the vehicle width direction and is formed across the bent part between the joining portion 34 and the inclined portion 32. As illustrated in FIG. 6, each of the stiffening ribs 36 is a recessed stiffening rib recessed downwards and the cross section of the stiffening rib 36 seen from the vehicle width direction is formed in a substantially semicircular arc shape.

As illustrated in FIG. 5, a reinforcing flange 38 is disposed in both end portions of the reinforcement 12 in the vehicle width direction (direction in which the reinforcement 12 is bridged). The reinforcing flange 38 extends from the outer edge of the reinforcement 12 upwards or downwards. In the first embodiment, the reinforcing flange 38 extends downwards from the front end edge of the front flange portion 12B in the inclined portion 32. Likewise, the reinforcing flange 38 extends downwards from the rear end edge of the rear flange portion 12C in the inclined portion 32.

The end portion of the reinforcing flange 38 that is on the inside in the vehicle width direction is positioned at the boundary part between the inclined portion 32 and the support portion 30, and the end portion of the reinforcing flange 38 that is on the outside in the vehicle width direction is positioned in the joining portion 34. In other words, the end portion of the reinforcing flange 38 that is on the outside in the vehicle width direction extends downwards from each of the front end edge of the front flange portion 12B and the rear end edge of the rear flange portion 12C.

Action and Effect

The action and effect of the first embodiment will be described below.

As illustrated in FIG. 1, in the vehicle lower portion structure according to the first embodiment, the resinous rear floor panel 10 constitutes the floor of the vehicle cabin, By the rear floor panel 10 of the vehicle rear portion being formed of resin as described above, the weight of the vehicle rear portion can be reduced compared to a structure to which a metallic rear floor panel is applied.

As illustrated in FIGS. 2 and 3, in the first embodiment, the hydrogen tank T is supported by the metallic reinforcement 12 bridged between the vehicle skeleton members 21 on the lower side of the rear floor panel 10. As a result, a load from the hydrogen tank T is transmitted to the rear member 22 and the rear floor side 20 via the reinforcement 12. In this manner, direct load transmission from the hydrogen tank T to the rear floor panel 10 can be suppressed. In other words, damage to the rear floor panel 10 attributable to a load from the hydrogen tank T can be suppressed.

Especially, in the first embodiment, the support member 28 supports the hydrogen tank T and the support member 28 is connected to the rear cross member 14 and the reinforcement 12. As a result, a load from the hydrogen tank T can be dispersed to the rear cross member 14 and the reinforcement 12.

Furthermore, in the first embodiment, at least a part (the support portion 30 and the inclined portion 32) of the reinforcement 12 is formed in a substantially hat shape in section as a result, the rigidity of the reinforcement 12 can be improved. Especially, by the reinforcement 12 being formed in a substantially hat shape that opens upwards in section as in the first embodiment, a large gap can be maintained between the reinforcement 12 and the rear floor panel 10 compared to an upside-down hat-shaped reinforcement. In this manner, a vehicle-mounted object such as the hydrogen tank T can be easily separated from the rear floor panel 10 and interference between the vehicle-mounted object and the rear floor panel 10 can be suppressed.

In the first embodiment, the reinforcement 12 is shaped such that the support portion 30 in the middle portion in the vehicle width direction is positioned closer to the lower side than both end portions in the vehicle width direction. As a result, the support portion 30 can be separated from the rear floor panel 10 and interference between the reinforcement 12 and the rear floor panel 10 can be suppressed compared to a configuration in which a linear reinforcement is bridged along the lower surface of the rear floor panel 10 without the inclined portion 32 being formed.

As illustrated in FIGS. 5 and 6, in the first embodiment, the stiffening rib 36 is formed in the vicinity of the joining portion 34 of the reinforcement 12. As a result, the strength and the rigidity of the joining portion 34 can be improved. Here, the joining portion 34 of the reinforcement 12 is a part joined to the rear floor side 20, and thus a load from the hydrogen tank T is likely to concentrate thereon. By the strength and the rigidity of the joining portion 34 of the reinforcement 12 being improved as in the first embodiment, breaking of the joining portion 34 of the reinforcement 12 can be effectively suppressed even in a case where a load from the hydrogen tank T concentrates on the reinforcement 12.

Furthermore, in the first embodiment, the reinforcing flange 38 is disposed in both end portions of the reinforcement 12 in the vehicle width direction. As a result, the strength and the rigidity of both end portions of the reinforcement 12 in the vehicle width direction can be improved.

Second Embodiment

Figure 7:
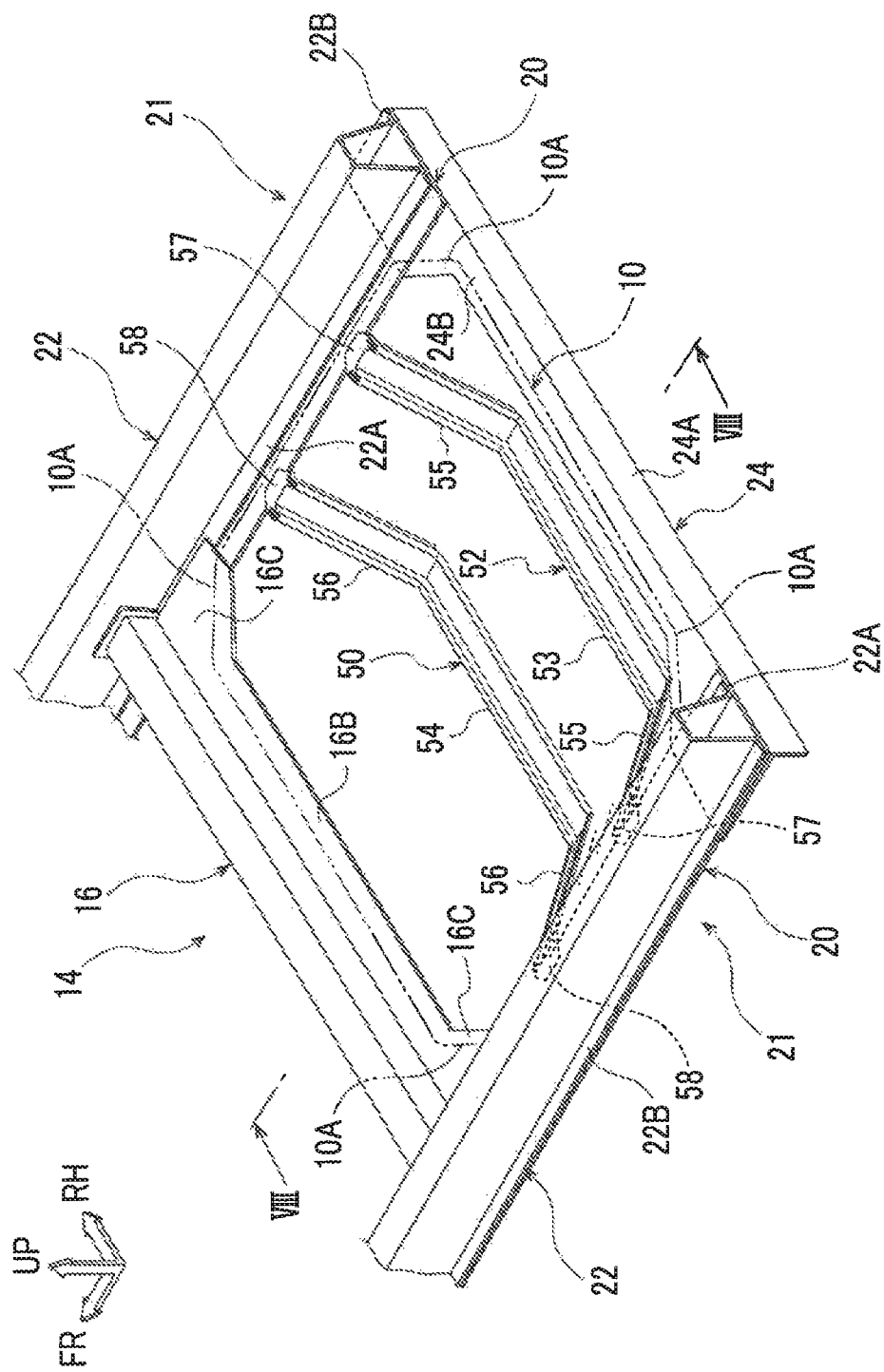
FIG. 7 is a perspective view illustrating a vehicle rear floor to which a vehicle lower portion structure according to a second embodiment is applied.

A vehicle lower portion structure according to a second embodiment will be described below. The same reference numerals will be used to refer to configurations similar to those of the first embodiment and description thereof will be appropriately omitted. As illustrated in FIG. 7, in the vehicle lower portion structure according to the second embodiment, a plurality of reinforcements, such as two reinforcements 50, 52, is provided to be spaced apart from each other in the vehicle front-rear direction on the lower side of the rear floor panel 10.

The reinforcement 50 and the reinforcement 52 are structures similar to the reinforcement 12 of the first embodiment. In other words, the reinforcement 50 is configured to include a support portion 54 in the middle portion in the vehicle width direction, an inclined portion 56 inclined to the outside in the vehicle width direction and upwards from both end portions of the support portion 54 in the vehicle width direction, and a joining portion 58 extending substantially horizontally from the end portion of the inclined portion 56 that is on the outside in the vehicle width direction. The joining portion 58 overlaps and is joined by spot welding or the like to the upper surface of the rear floor side 20.

The reinforcement 52 is configured to include a support portion 53 in the middle portion in the vehicle width direction, an inclined portion 55 inclined to the outside in the vehicle width direction and upwards from both end portions of the support portion u in the vehicle width direction, and a joining portion 57 extending substantially horizontally from the end portion of the inclined portion 55 that is on the outside in the vehicle width direction. The joining portion 57 overlaps and is joined by spot welding or the like to the upper surface of the rear floor side 20.

The support portion 54 and the inclined portion 56 of the reinforcement 50 are formed in a substantially hat shape that opens upwards in section when seen from the vehicle width direction (longitudinal direction). In other words, the reinforcement 50 is configured to include a projecting portion 50A that has a substantially U-shape in section, a front flange portion 50B that extends forwards from the projecting portion 50A, and a rear flange portion 50C that extends rearwards from the projecting portion 50A. Likewise, the support portion 53 and the inclined portion 55 of the reinforcement 52 are formed in a substantially hat shape that opens upwards in section when seen from the vehicle width direction (longitudinal direction). In other words, the reinforcement 52 is configured to include a projecting portion 52A that has a substantially U-shape in section, a front flange portion 52B that extends forwards from the projecting portion 52A, and a rear flange portion 52C that extends rearwards from the projecting portion 52A.

The reinforcement 50 is positioned on the lower side of the front end portion of the rear floor panel 10 and is bridged between the vehicle skeleton members 21 that the rear member 22 and the rear floor side 20 constitute. The reinforcement 52 is positioned on the lower side of the rear end portion of the rear floor panel 10 and is bridged between the vehicle skeleton members 21 that the rear member 22 and the rear floor side 20 constitute. The reinforcement 50 and the reinforcement 52 are disposed substantially in parallel to each other.

Figure 8:
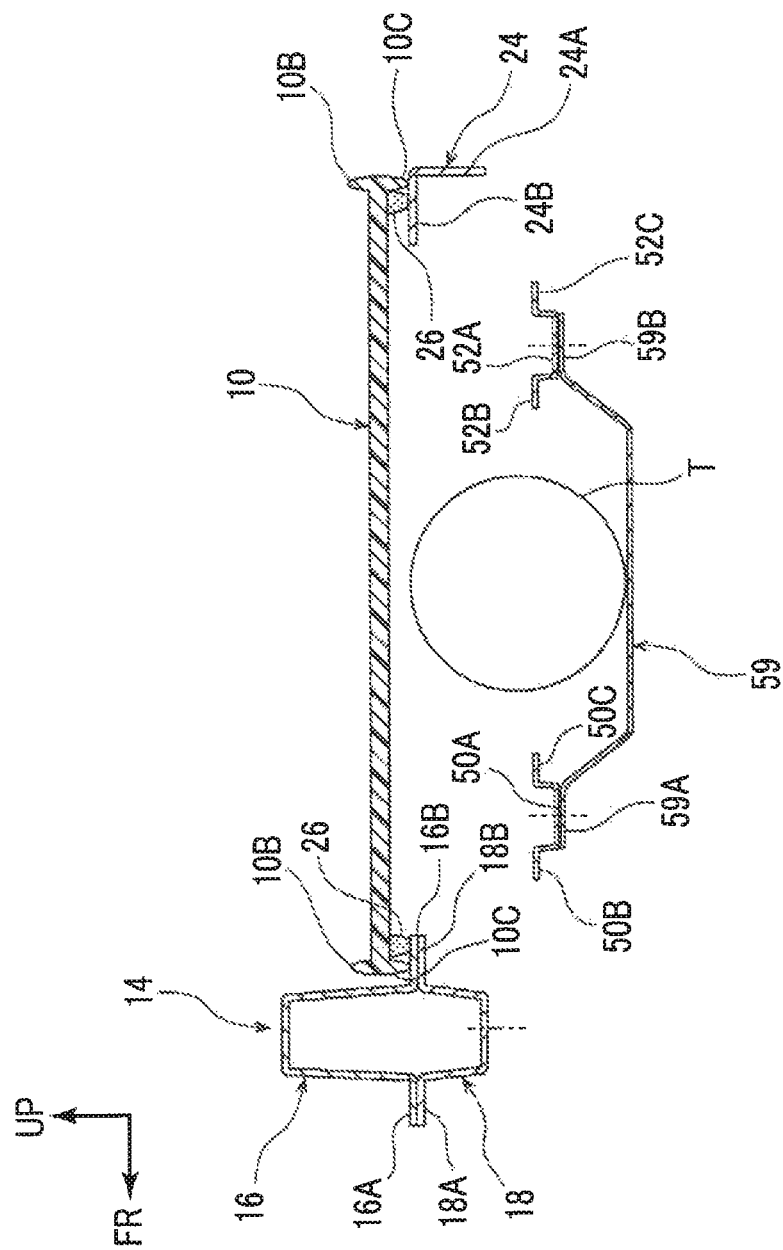
FIG. 8 is a sectional view taken along line VIII-VIII of FIG. 7.

As illustrated in FIG. 8, a support member 59 supporting the hydrogen tank T as a vehicle-mounted object is disposed on the lower side of the rear floor panel 10. The support member 59 is a metal member formed in a substantially hat shape in section when seen from the vehicle width direction, and a front flange portion 59A extends forwards from the front end portion of the support member 59. The front flange portion 59A is joined to the bottom surface of the projecting portion 50A in the support portion 54 of the reinforcement 50. A rear flange portion 59B extends rearwards from the rear end portion of the support member 59, and the rear flange portion 59B is joined to the bottom surface of the projecting portion 52A in the support portion 53 of the reinforcement 52. In other words, the support member 59 is connected to the front reinforcement 50 and the rear reinforcement 52 and supported by the reinforcement 50 and the reinforcement 52.

Action and Effect

The action and effect of the second embodiment will be described below.

In the vehicle lower portion structure according to the second embodiment, the support member 59 is connected to the front reinforcement 50 and the rear reinforcement 52. In addition, the support member 59 supports the hydrogen tank T, and thus a load from the hydrogen tank T can be dispersed to the reinforcements 50, 52. The load is transmitted to the vehicle skeleton member 21 from the reinforcement 50 and the reinforcement 52. As a result, concentration of the load from the hydrogen tank T on one reinforcement can be suppressed.

The gap between the reinforcement 50 and the reinforcement 52 in the vehicle front-rear direction can be easily adjusted in accordance with the size of a vehicle-mounted object. The rest of the action of the second embodiment is similar to that of the first embodiment.

Third Embodiment

Figure 9:
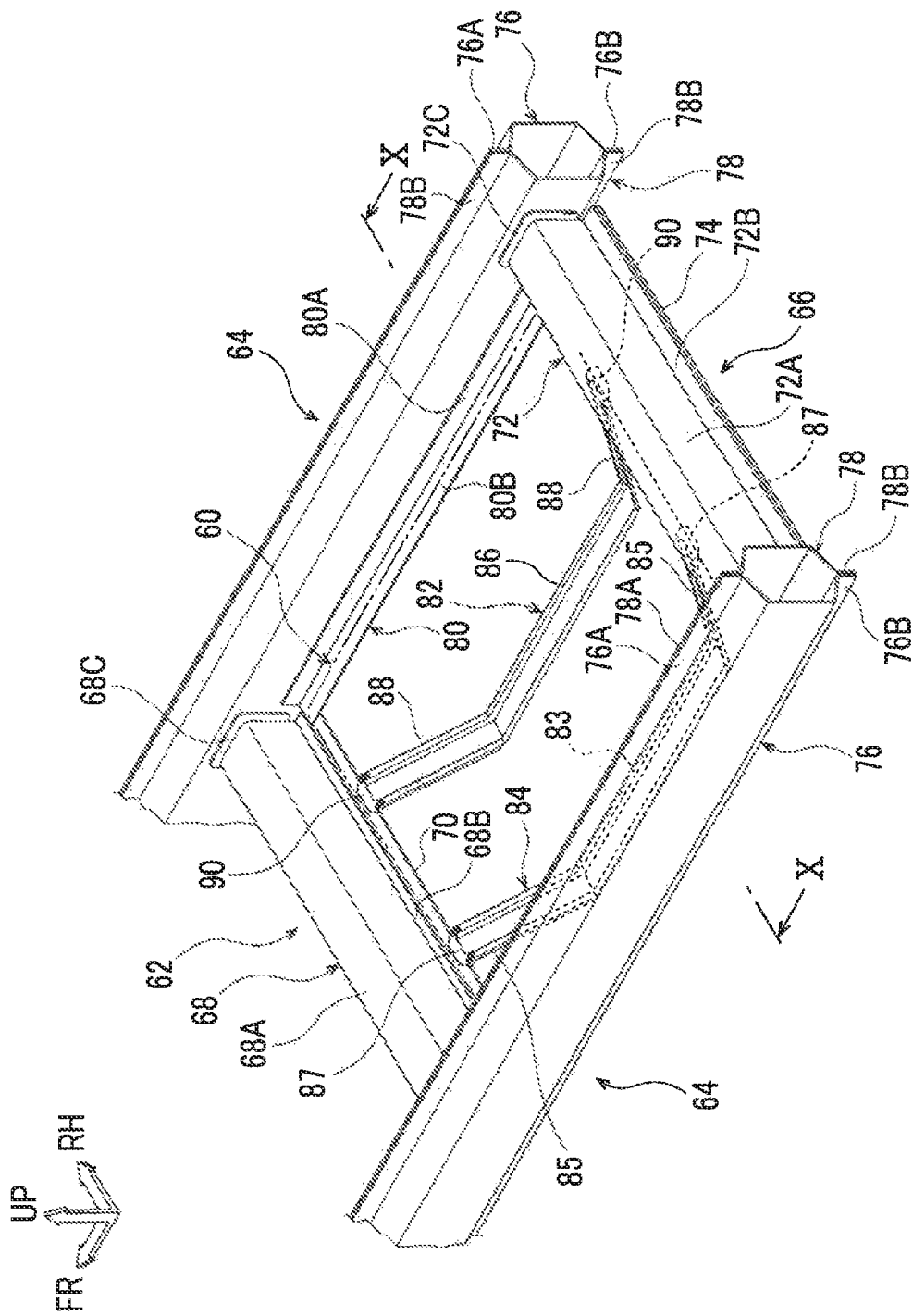
FIG. 9 is a perspective view illustrating a vehicle front floor to which a vehicle lower portion structure according to a third embodiment is applied.

A vehicle lower portion structure according to a third embodiment will be described below. The same reference numerals will be used to refer to configurations similar to those of the first embodiment and description thereof will be appropriately omitted. As illustrated in FIG. 9, the vehicle lower portion structure according to the third embodiment is applied to a vehicle front portion and provided with a resinous front floor panel 60 as a floor panel.

Figure 10:
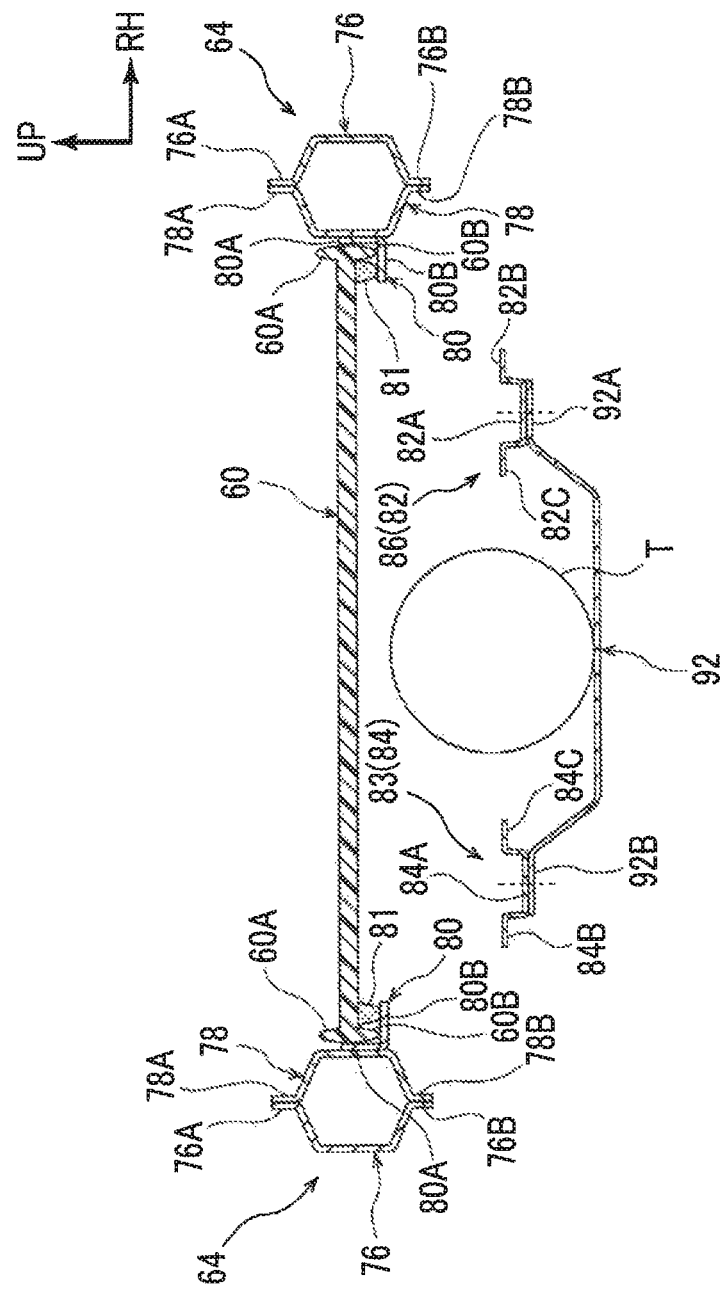
FIG. 10 is a sectional view taken along line X-X of FIG. 9.

The front floor panel 60 is formed in a flat plate shape and of fiber reinforced plastic such as glass fiber reinforced plastic (GFRP) and carbon fiber reinforced plastic (CFRP). The front floor panel 60 constitutes a vehicle cabin floor surface in the vehicle front portion. As illustrated in FIG. 10, an upper rib 60A extends upwards from the outer peripheral edge portion of the front floor panel 60 and a lower rib 60B extends downwards from the outer peripheral edge portion of the front floor panel 60. The rigidity of the front floor panel 60 is enhanced by the upper rib 60A and the lower rib 60B.

As illustrated in FIG. 9, the front end portion of the front floor panel 60 is joined to a first front cross member 62 constituting a vehicle skeleton member. Both end portions of the front floor panel 60 in the vehicle width direction are joined to rocker panels 64 as vehicle skeleton members. Furthermore, the rear end portion of the front floor panel 60 is joined to a second front cross member 66 as a vehicle skeleton member.

The first front cross member 62 is a metal member extending in the vehicle width direction and is bridged between the rocker panels 64. The first front cross member 62 is configured to include an upper panel 68 and a lower panel 70. The upper panel 68 is formed in a substantially hat shape that opens downwards in section when seen from the vehicle width direction. The upper panel 68 is configured to include a projecting portion 68A, a front flange portion (not illustrated) extending forwards from the projecting portion 68A, and a rear flange portion 68B extending rearwards from the projecting portion 68A. Right and left flanges 68C extend along the rocker panel 64 from both end portions of the upper panel 68 in the vehicle width direction. The right and left flanges 68C overlap and are joined by spot welding or the like to the rocker panel 64.

The lower panel 70 is formed in a flat plate shape and positioned below the upper panel 68. The first front cross member 62 is a vehicle skeleton member that has a closed sectional shape by the lower panel 70 and the front flange portion and the rear flange portion 68B of the upper panel 68 being joined by spot welding or the like to each other.

The second front cross member 66 is a metal member extending in the vehicle width direction substantially in parallel to the first front cross member 62 and is bridged between the rocker panels 64. The second front cross member 66 is configured to include an upper panel 72 and a lower panel 74. The upper panel 72 is formed in a substantially hat shape that opens downwards in section when seen from the vehicle width direction. The upper panel 72 is configured to include a projecting portion 72A, a front flange portion (not illustrated) extending forwards from the projecting portion 72A, and a rear flange portion 72B extending rearwards from the projecting portion 72A. Right and left flanges 72C extend along the rocker panel 64 from both end portions of the upper panel 72 in the vehicle width direction. The right and left flanges 72C overlap and are joined by spot welding or the like to the rocker panel 64.

The lower panel 74 is formed in a flat plate shape and positioned below the upper panel 72. The second front cross member 66 is a vehicle skeleton member that has a closed sectional shape by the lower panel 74 and the front flange portion and the rear flange portion 72B of the upper panel 72 being joined by spot welding or the like to each other.

A pair of the right and left rocker panels 64 is disposed as metal members with both sides in the vehicle width direction extending in the vehicle front-rear direction. Each of the rocker panels 64 is configured to include a rocker panel outer panel 76 positioned on the outside in the vehicle width direction and a rocker panel inner panel 78 positioned on the inside in the vehicle width direction.

The rocker panel outer panel 76 is formed in a substantially hat shape that opens inwards in the vehicle width direction in section by press molding being performed on a metal plate. An outer side upper flange 76A and an outer side lower flange 76B extend in the upper and lower end portions of the rocker panel outer panel 76, respectively.

The rocker panel inner panel 78 is formed in a substantially hat shape that opens outwards in the vehicle width direction in section by press molding being performed on a metal plate. An inner side upper flange 78A and an inner side lower flange 78B extend in the upper and lower end portions of the rocker panel inner panel 78, respectively. The outer side upper flange 76A and the inner side upper flange 78A overlap and are joined by spot welding or the like to each other. The outer side lower flange 76B and the inner side lower flange 78B overlap and are joined by spot welding or the like to each other. The rocker panel 64 is a vehicle skeleton member that has a closed sectional shape by the rocker panel outer panel 76 and the rocker panel inner panel 78 being joined to each other as described above.

A support bracket 80 that has a substantially L-shape in section is joined to each of the rocker panel inner panels 78 of the rocker panels 64. As illustrated in FIG. 10, the support bracket 80 is configured to include a first surface 80A extending in the vehicle up-down direction and joined to the rocker panel inner panel 78 and a second surface 80B extending to the inside in the vehicle width direction from the lower end portion of the first surface 80A. Both end portions of the front floor panel 60 in the vehicle width direction overlap the second surface 80B from above, and the front floor panel 60 is joined by an adhesive 81 to the second surface 80B from above.

As illustrated in FIG. 9, the front end portion of the front floor panel 60 overlaps and is joined by an adhesive (not illustrated) to the lower panel 70 of the first front cross member 62 from above. Furthermore, the rear end portion of the front floor panel 60 overlaps and is joined by an adhesive (not illustrated) to the lower panel 74 of the second front cross member 66 from above.

A pair of right and left reinforcements 82, 84 is disposed on the lower side of the front floor panel 60. The reinforcement 82 and the reinforcement 84 are elongated metal members, and the vehicle front-rear direction is the longitudinal direction thereof. The reinforcement 82 and the reinforcement 84 are bridged between the first front cross member 62 and the second front cross member 66.

The reinforcement 82 is configured to include a support portion 86 in the middle portion in the vehicle front-rear direction, an inclined portion 88 inclined to the outside in the vehicle front-rear direction and upwards from both end portions of the support portion 86 in the vehicle front-rear direction, and a joining portion 90 extending substantially horizontally from the end portion of the inclined portion 88 that is on the outside in the vehicle front-rear direction. The joining portion 90 on the front side of the reinforcement 82 overlaps and is joined by spot welding or the like to the first front cross member 62, and the joining portion 90 on the rear side of the reinforcement 82 overlaps and is joined by spot welding or the like to the second front cross member 66.

The reinforcement 84 is configured to include a support portion 83 in the middle portion in the vehicle front-rear direction, an inclined portion 85 inclined to the outside in the vehicle front-rear direction and upwards from both end portions of the support portion 83 in the vehicle front-rear direction, and a joining portion 87 extending substantially horizontally from the end portion of the inclined portion 85 that is on the outside in the vehicle front-rear direction. The joining portion 87 on the front side of the reinforcement 84 overlaps and is joined by spot welding or the like to the first front cross member 62, and the joining portion 87 on the rear side of the reinforcement 84 overlaps and is joined by spot welding or the like to the second front cross member 66.

The support portion 86 and the inclined portion 88 of the reinforcement 82 are formed in a substantially hat shape that opens upwards in section when seen from the vehicle front-rear direction (longitudinal direction). In other words, as illustrated in FIG. 10, the reinforcement 82 is configured to include a projecting portion 82A that has a substantially U-shape in section, an outside flange portion 82B that extends to the outside in the vehicle width direction from the projecting portion 32A, and an inside flange portion 82C that extends to the inside in the vehicle width direction from the projecting portion 82A. Likewise, the support portion 83 and the inclined portion 85 of the reinforcement 84 are formed in a substantially hat shape that opens upwards in section when seen from the vehicle front-rear direction (longitudinal direction). In other words, the reinforcement 84 is configured to include a projecting portion 84A that has a substantially U-shape in section, an outside flange portion 84B that extends to the outside in the vehicle width direction from the projecting portion 84A, and an inside flange portion 84C that extends to the inside in the vehicle width direction from the projecting portion 84A.

As illustrated in FIG. 10, a support member 92 is disposed on the lower side of the front floor panel 60 and the support member 92 supports the hydrogen tank T.

The support member 92 is a metal member formed in a substantially hat shape in section when seen from the vehicle front-rear direction, and a right flange portion 92A extends to the vehicle right side from the right side end portion of the support member 92. The right flange portion 92A is joined to the bottom surface of the projecting portion 82A in the support portion 86 of the reinforcement 82. A left flange portion 92B extends to the vehicle left side from the left side end portion of the support member 92, and the left flange portion 92B is joined to the bottom surface of the projecting portion 84A in the support portion 83 of the reinforcement 84. In other words, the support member 92 is connected to the reinforcement 82 and the reinforcement 84 and supported by the reinforcement 82 and the reinforcement 84.

Action and Effect

The action and effect of the third embodiment will be described below.

In the vehicle lower portion structure according to the third embodiment, the resinous front floor panel 60 constitutes the floor of the vehicle cabin. By the front floor panel 60 of the vehicle front portion being formed of resin as described above, the weight of the vehicle front portion can be reduced compared to a structure to which a metallic front floor panel is applied.

In the third embodiment, the metallic reinforcement 82 and the metallic reinforcement 84 are bridged between the first front cross member 62 and the second front cross member 66 on the lower side of the front floor panel 60. The hydrogen tank T is supported by the reinforcement 62 and the reinforcement 84. As a result, a load from the hydrogen tank T is transmitted to the first front cross member 62 and the second front cross member 66 via the reinforcement 82 and the reinforcement 84. In this manner, direct load transmission from the hydrogen tank T to the front floor panel 60 can be suppressed. In other words, damage to the front floor panel 60 attributable to a load from the hydrogen tank T can be suppressed.

Especially, in the third embodiment, the support member 92 supports the hydrogen tank T and the support member 92 is connected to the first front cross member 62 and the second front cross member 66. As a result, a load from the hydrogen tank T can be dispersed to the first front cross member 62 and the second front cross member 66.

Fourth Embodiment

Figure 11:
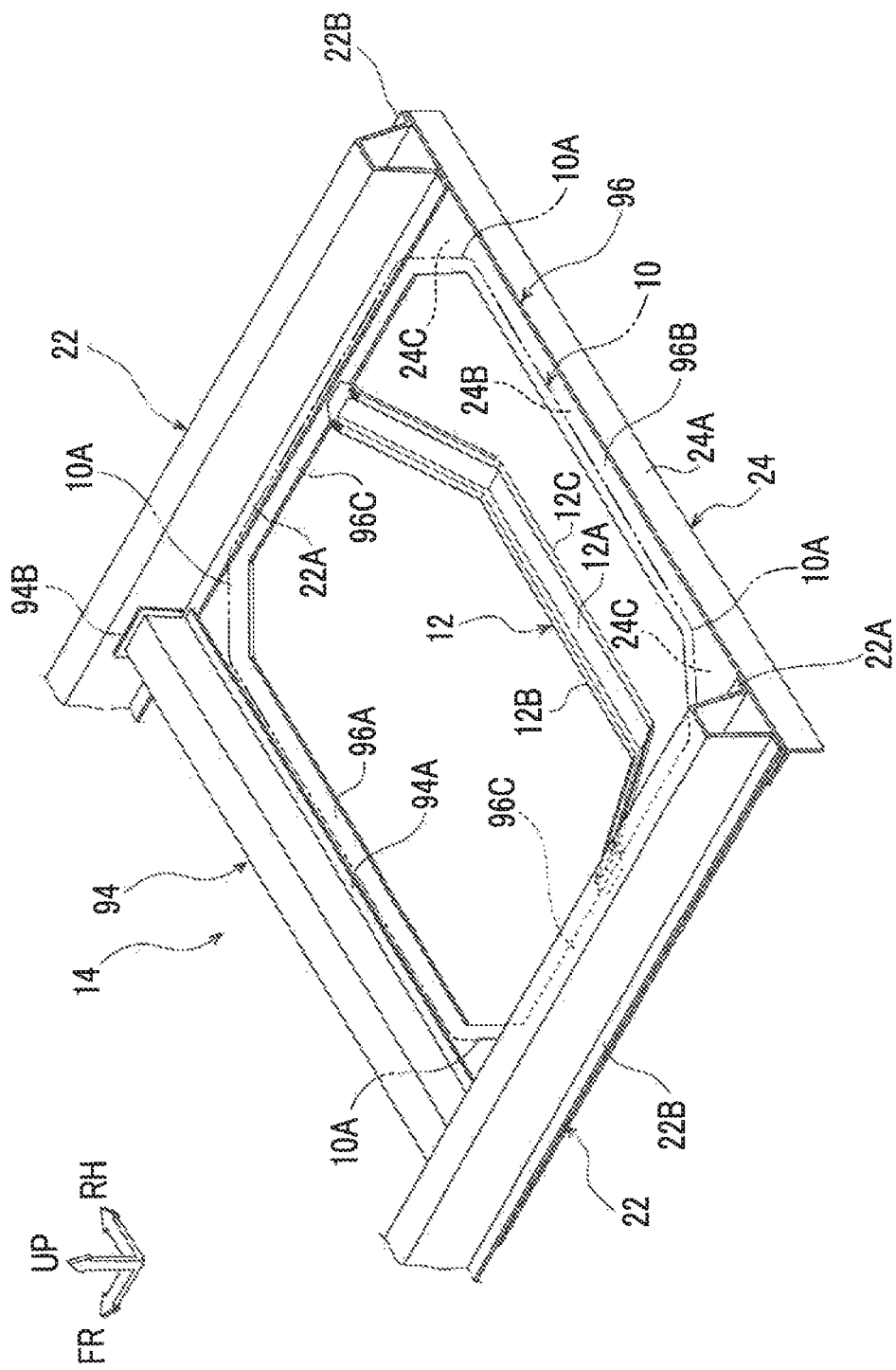
FIG. 11 is a perspective view illustrating a vehicle rear floor to which a vehicle lower portion structure according to a fourth embodiment is applied.

A vehicle lower portion structure according to a fourth embodiment will be described below. The same reference numerals will be used to refer to configurations similar to those of the first embodiment and description thereof will be appropriately omitted. As illustrated in FIG. 11, in the vehicle lower portion structure according to the fourth embodiment, the rear floor panel 10 is joined to the upper surface of a frame-shaped member 96.

The frame-shaped member 96 includes a front portion 96A, a rear portion 96B, and a pair of right and left side portions 96C and is formed in a substantially rectangular frame shape in plan view. The front portion 96A is positioned below an upper panel 94 of the rear cross member 14 and extends in the vehicle width direction. The front portion 96A overlaps and is joined by spot welding or the like to the lower surfaces of an upper side front flange (not illustrated)

of the upper panel 94 and an upper side rear flange 94A. As a result, the front portion 96A and the upper panel 94 constitute a vehicle skeleton member that has a closed sectional structure. In other words, the lower panel 18 described in the first embodiment is not disposed in the fourth embodiment.

The rear portion 96B overlaps and is joined by spot welding or the like to the upper surface of the lateral wall portion 24B of the attachment bracket 24. The right and left side portions 96C connect both end portions of the front portion 96A and the rear portion 96B in the vehicle width direction in the vehicle front-rear direction, and each of the right and left side portions 96C is disposed below the rear member 22. The side portion 96C overlaps and is joined by spot welding or the like to the lower surfaces of the inside flange 22A and the outside flange 22B. As a result, the side portion 96C and the rear member 22 constitute a vehicle skeleton member that has a closed sectional structure. In other words, the rear floor side 20 described in the first embodiment is not disposed in the fourth embodiment.

The rear floor panel 10 is joined by an adhesive to the upper surface of the frame-shaped member 96 configured as described above.

Action and Effect

The action and effect of the fourth embodiment will be described below.

In the vehicle lower portion structure according to the fourth embodiment, the surface to which the rear floor panel 10 is joined can be the same continuous plane, and thus inclination of the rear floor panel 10 can be effectively suppressed. The number of parts can be reduced compared to the first embodiment. The rest of the action of the fourth embodiment is similar to that of the first embodiment.

Although the vehicle lower portion structure according to the first to fourth embodiments has been described above, it is a matter of course that the disclosure can be implemented in various aspects within the scope of the disclosure. For example, although the upper rib 10B extends upwards from the outer peripheral edge portion of the rear floor panel 10 and the lower rib 10C extends downwards from the outer peripheral edge portion of the rear floor panel 10 as illustrated in FIGS. 2 and 3 in the embodiment described above, the disclosure is not limited thereto and a structure that has no rib may be adopted instead. The same applies to the front floor panel 60.

In the embodiment described above, the corner portion 10A of the rear floor panel 10 is cut as illustrated in FIG. 1. However, the disclosure is not limited thereto. Although warping of the rear floor panel 10 can be suppressed by the corner portion 10A being cut, use without corner portion cutting is also possible as in the case of the front floor panel 60 according to the third embodiment. In this case, the expanded portion 16C of the rear cross member 14 and the expanded portion 24C of the attachment bracket 24 do not have to be disposed and further weight reduction can be achieved.

Furthermore, although the rear floor panel 10 has a flat surface shape in the embodiment described above, the disclosure is not limited thereto. For example, the shape of the rear floor panel 10 may vary with the shape of a vehicle-mounted object.

Although the reinforcement 12 and the rear floor side 20 are joined to each other inside the portion where the rear member 22 and the rear floor side 20 are welded in the vehicle width direction as illustrated in FIG. 3 in the embodiment described above, the disclosure is not limited thereto. For example, the three pieces of the rear member 22, the rear floor side 20, and the reinforcement 12 may overlap and be joined by spot welding or the like to one another with the inside flange 22A of the rear member 22 extended up to the inside end portion of the rear floor side 20.

In the embodiment described above, the hydrogen tank T as a vehicle-mounted object is supported by two support members 28. However, the disclosure is not limited thereto. For example, the vehicle-mounted object may be supported by one support member wider in the vehicle width direction than the support member 28. In addition, the vehicle-mounted object may be supported by three or more support members. Furthermore, the shape of the support member is not limited and the support member may have any shape insofar as the shape allows a vehicle-mounted object to be supported.

What is claimed is:

1. A vehicle lower portion structure comprising:
    a resinous floor panel constituting a vehicle cabin floor surface;
    a metallic reinforcing member (i) bridged between a pair of vehicle skeleton members that are on a lower side of the floor panel and (ii) configured to support a vehicle-mounted object disposed on the lower side of the floor panel;
    a cross member bridged between the vehicle skeleton members on a front side or a rear side of the reinforcing member; and
    a support member connected to the cross member and the reinforcing member and configured to support the vehicle-mounted object, the support member being disposed on the lower side of the floor panel,
    wherein the pair of vehicle skeleton members extend in a vehicle front-rear direction at both sides of the floor panel in a vehicle width direction.

2. The vehicle lower portion structure according to claim 1, wherein:
    a plurality of the reinforcing members are provided such that the reinforcing members are spaced apart from each other in the vehicle front-rear direction; and
    the support member is connected to the plurality of reinforcing members.

3. The vehicle lower portion structure according to claim 1, wherein:
    the reinforcing member is an elongated member with a longitudinal direction corresponding to a bridged direction of the reinforcing member; and
    at least a part of the reinforcing member is in a hat shape that opens upwards in section when seen from the longitudinal direction.

4. The vehicle lower portion structure according to claim 1, further comprising a stiffening rib in a vicinity of a joining part of the reinforcing member and one of the vehicle skeleton members.

5. The vehicle lower portion structure according to claim 1, wherein at least at each end portion of the reinforcing member in a bridged direction of the reinforcing member, a reinforcing flange extends upwards or downwards from an outer edge of the reinforcing member.

6. The vehicle lower portion structure according to claim 1, wherein the floor panel is a rear floor panel disposed in a vehicle rear portion.

7. A vehicle lower portion structure comprising:
    a resinous floor panel constituting a vehicle cabin floor surface; and a metallic reinforcing member (i) bridged between a pair of vehicle skeleton members that are on a lower side of the floor panel and (ii) configured to support a vehicle-mounted object disposed on the lower side of the floor panel;

wherein the pair of vehicle skeleton members extend in a vehicle front-rear direction at both sides of the floor panel in a vehicle width direction, a plurality of the reinforcing members are provided such that the reinforcing members are spaced apart from each other in the vehicle front-rear direction, and the support member is connected to the plurality of reinforcing members.

8. A vehicle lower portion structure comprising:

a resinous floor panel constituting a vehicle cabin floor surface; and a metallic reinforcing member (i) bridged between a pair of vehicle skeleton members that are on a lower side of the floor panel and (ii) configured to support a vehicle-mounted object disposed on the lower side of the floor panel, wherein the reinforcing member is an elongated member with a longitudinal direction corresponding to a bridged direction of the reinforcing member, and at least a part of the reinforcing member is in a hat shape that opens upwards in section when seen from the longitudinal direction.

* * * * *